United States Patent [19]

Cline et al.

[11] 3,719,763

[45] March 6, 1973

[54] BINARY AMINO OVICIDAL COMPOSITION

[75] Inventors: Richard F. Cline; Donald P. Wilton, both of Savannah, Ga.

[73] Assignee: The United States of America as represented by the Secretary of Health, Education and Welfare

[22] Filed: Sept. 29, 1969

[21] Appl. No.: 862,056

[52] U.S. Cl. ................... 424/325, 424/250, 424/327
[51] Int. Cl. ................................. A01n 9/20
[58] Field of Search ...................................... 424/325

[56] References Cited

OTHER PUBLICATIONS

Merck Index, 7th Ed. 1960, p. 420

Primary Examiner—Jerome D. Goldberg
Assistant Examiner—Vincent D. Turner
Attorney—John S. Roberts and Norman J. Latker

[57] ABSTRACT

A binary aqueous spray ovicidal composition useful in controlling *Aedes aegypti* consisting of a minor amount (0.05 to .4 percent) of an apolar amine (e.g., decylamine) and a major amount (1 to 2 percent) of a polar amine (e.g., ethanolamine).

6 Claims, No Drawings

3,719,763

BINARY AMINO OVICIDAL COMPOSITION

THE INVENTION

The present invention comprises a binary aqueous spray ovicidal composition useful against *Aedes aegypti* consisting of a minor amount (0.05 to 0.4 percent) of an apolar amine (e.g., decylamine) and a major amount (1 to 2 percent) of a polar amine (e.g., ethanolamine).

THE PRIOR ART

U.S. Pat. No. 2,523,177 Yowell et al. (SOD) teaches an ethylene diamine ether type condensation for destroying fungi, etc. Other U.S. patents, such as U.S. Pats. No. 2,464,284 Alles, No. 2,952,707 Nikawitz, and No. 3,341,405 Weil, utilize amines in biocidal and pesticidal settings tangential to the present invention.

Closer to the problem solved by the present invention; that is, the ovicidal activity of the binary amine composition on *Aedes aegypti*, is the recent literature art. In 1962, Judson et al. (J. Econ. Entomol. 55(5): 805–807) published on the effects of various fumigant chemicals on eggs of the yellow fever mosquito (*Aedes aegypti*) but the authors did not discuss aqueous formulations, and the chemicals taught, such as acrylonitrile, etc., were different from those presently considered. In 1967, Mulla et al. (J. Econ. Entomol. 60(2):515–522) published "Biocidal and Biostatic Activity of Aliphatic Amines Against Southern House Mosquito Larvae and Pupae," and in 1968 Mulla and Chaudhury (J. Econ. Entomol. 61(2):510–515) published "Ovicidal Activity of Aliphatic Amines and Petroleum Oil Against Two Species of Mosquitoes." Against southern house mosquitoes, Mulla's dip compositions embodying apolar amines, such as decylamine, were effective since the ovicidal activity occurred at or below the water line. However, Mulla's compounds have been found ineffective against *Aedes aegypti* where egg deposits were on a moist surface just above the water line and a spray, not a dip, was indicated. Furthermore, it appears that the aedine eggs are resistant to the sole action of an apolar amine; e.g., decylamine, unless a potentiator or activator such as an polar amine like ethanolamine is added in a majority amount.

Wilton, Cline and Fay (December, 1968, Mosquito News 28(4):602–606) teach some of the more pertinent features of the present invention.

THE WATER-SOLUBLE (W/S) POLAR AMINE

The polar amine component is selected from aminoethanols containing 2–6 carbon atoms corresponding to the following formula:

$$H_2N-CHX-(CHY)_n-CHZ-OH$$

where $n=0-4$
X, Y and Z are H and
where $n=0$
X is $-CH_2CH_3$
Z is H and
where $n=0$
X is H
Z is $-CH_3$ and from diamines selected from hydrazine, $H_2N-NH_2$, primary diamines with 2–3 carbon atoms corresponding to the following formula:

$$H_2N-(CH_2)_n-CHX-NH_2$$

where $n=1-2$
X is H and
where $n=1$
X is $-CH_3$ and from the secondary diamine, piperazine, $$HN\begin{array}{c}CH_2-CH_2\\ \\CH_2-CH_2\end{array}NH$$

A most preferred component is ethanolamine, $H_2N(CH_2)_2OH$. In combination with β-diamines (Duomeen L-11-Armour, post), 3-amino-1-propanol in addition to ethanolamine provided superior activity. Exemplary of additional aminoethanols showing good activity are 1-amino-2-propanol and 2-amino-1-butanol.

In the diamine series, it was found that hydrazine, 1,2-diaminoethane, and 1,2-diaminopropane were almost as effective as the most preferred ethanolamine in combination with decylamine. However, in combination with the β-diamines, such as Duomeen L-11, L-15 post, only hydrazine showed commercial activity, and in general, with the exception of the single compound piperazine, diamines with more than 3 carbon atoms were quite inactive in the composition.

The polar amine component is utilized in a range of about 1–2 percent of the total aqueous composition and thus, compared to the apolar component, it comprises the major or primary component.

One speculated modus of action of the polar amine or the preferred ethanolamine is that the polar compound makes effective the penetration of the long chain apolar compound, which is the effective killing agent. It is known that at high concentrations, e.g., 10 percent of total spray volume, ethanolamine itself along may act as a larvicide, but such utilization is commercially unfeasible. The present invention in its preferred embodiment comprises an aqueous spray containing about 1% ethanolamine, together with about 0.1–0.2 percent of a long chain amine such as decylamine.

THE APOLAR AMINE

The minor but probably the larvicide acting constituent is a biodegradable long chain apolar aliphatic amine. Suitable aliphatic amines are:

a. Straight chain α-amines such as octylamine and decylamine, or generally $H_3C-(CH_2)_n-NH_2$ when $n=7-$. The ovicidal results uniformly show a narrow range of specificity and it has been found that carbon chains in excess of and below that designated will not operate satisfactorily. Conversely, decylamine proved to be the component of choice giving ovicidal toxicity consistently superior to the other alternatives.

b. Diamines. Compounds of the following structures have been found useful in the practice of this invention:
1. β-diamines
$RCH(NHCH_2CH_2CH_2NH_2)CH_3$ when $R=C_9-C_{13}$.
Thus, in the biodegradable long chain, the range of carbon atoms is $C_{11}-C_{15}$. Suitable commercial products are Duomeen L-11, L-15, etc. (Armour).
2. Alkoxypropyldiamine RO(CH$_2$)$_3$NH(CH$_2$)$_3$NH$_2$ where R=C$_{13}$. A suitable commercial product is Adogen 583 (Ashland).

Preferred apolar amines useful in sprays of the present invention are octylamine, decylamine, Duomeen L-11 and Adogen 583 as defined above.

The concentration preferred for ovicidal purposes is about 0.1–0.2 percent based on the total volume of the spray. However, formulations may be used wherein the apolar amine is operable at a broader range of concentrations of about 0.05 to 0.4 percent, and in all operable concentrations the apolar component of the binary amine composition is the minor component compared with the polar component.

MODUS OF ACTION

Smith et al. (1966) Ann Rev. Ent. 11, 331–368, point out that in addition to toxicity, an ovicide must meet the egg in a sufficiently exposed location and that there be a high enough proportion of the population in the egg stage to justify treatment. *Aedes aegypti*, as recipient of the ovicides, satisfies these requirements; i.e., the eggs are laid just above the water line and are susceptible to spray, and further the normally sufficient proportion of the population which will be aedine eggs will be enhanced following a dry spell, since the eggs deposited just above the water line do not hatch until submerged.

EXAMPLE 1

In order to simulate field conditions where eggs are deposited in tin cans, the *Aedes aegypti* mosquitoes utilized were induced to lay eggs on the roughened surfaces of aluminum panels instead of cans. After the eggs had completed embryonic development, the egg containing panels were mounted vertically and passed at a speed of 40 ft/min under a spray of the formulation. The equipment emulsified the formulation by stirring, and with a pressure of 40 lbs/sq in. forced the liquid through a T jet with nozzle, giving a spray in the shape of a fan. The panels were then held under standard conditions for 24 hours before submergence in a hatching medium to determine percentage hatch. It is noted in the accompaning results in Table I that the hatch was negligible with formulations containing both amines but quite large where either one was omitted.

EXAMPLE 2

In the same manner and with greater particularity of disclosure than in Example 1, fully embryonated eggs of *Ae. aegypti* were placed on a non-porous surface. Panels of roughened 40-gauge aluminum measuring 20 × 115 mm. served as an oviposition substrate. A flat-bottom, cylindrical glass dish was lined with the panels, which were retained and held upright by a length of coil spring encircling the inside of the dish. Approximately 4 cm. of tap water were added to the dish and it was left overnight in a colony of several thousand adult *Ae. aegypti*. On removal from the cage, the water was poured off and the dish with panels in place was put into a plastic bag to maintain 100 percent humidity and stored for 2 days at 80° ± 2° F. The bag was then removed and the panels kept at 85±5 percent relative humidity and 80° ± 2° F. for at least 1 additional day. Eggs thus conditioned were used at ages between 3 and 10 days. Prior to treatment, each panel was examined under a dissecting microscope and excess eggs were removed with a fine needle to permit an accurate count of those to be treated. At this time also any obviously nonviable eggs were discarded. Care was exercised to tough only those eggs to be discarded and to avoid damage to those retained on the panels.

The formulations utilized, which are summarized in Table II below, were prepared as emulsions and a magnetic stir bar was used to keep them homogeneous during the spray operation. Spray was delivered from an 8001 Teejet nozzle at 40 p.s.i. The panels, held vertically in a rack, were placed on a belt moving at 40 feet per minute and passed once through the spray which wet them to the point of run-off. Orientation of the panels and their direction of movement were both at right angles to the spray fan. Unsprayed eggs and eggs sprayed with water only were used as controls.

Following treatment, the panels were held for 24 hours at 80° ± 2° F. and 85±5 percent relative humidity. The percent hatch was then determined by comparison of egg and larval counts after a 2-hour hatch period. The hatching medium was a day-old culture containing brewer's yeast and pulverized lab chow.

TABLE I

Percent hatch of *Aedes aegypti* eggs on aluminum panels after spray applications of lipophilic amines in water or in 1% ethanolamine. Results based on tests with a mean of 493 eggs (range 220 to 1,230 eggs)

| Lipophilic amine (A) | Carbons in long chain | Percentage hatch[a] | | | | | |
|---|---|---|---|---|---|---|---|
| | | 0% E, 0.4% A | 1% ethanolamine (E) | | | | |
| | | | 0.025% A | 0.05% A | 0.1% A | 0.2% A | 0.4% A |
| RNH$_2$ (α-amines): | | | | | | | |
| Hexylamine | 6 | 76 | | | | 26 | 19 |
| Heptylamine | 7 | 50 | | | 33 | 15 | 0 |
| Octylamine | 8 | 51 | | 61 | 4 | 3 | 2 |
| Decylamine | 10 | 67 | 4 | 0 | 0.3 | 3 | |
| RCH(NH$_2$)CH$_3$ (β-amines): | | | | | | | |
| Armeen L-9 | 9 | 86 | | | 50 | 30 | 29 |
| Armeen L-11 | 11 | 82 | | 40 | 9 | 15 | 7 |
| Armeen L-15 | 15 | 74 | | 81 | 82 | 71 | |
| RCH(NHCH$_2$CH$_2$NH$_2$)CH$_3$ (β-diamines): | | | | | | | |
| Duomeen L-11 | 11 | 95 | 0.2 | 0 | 0.5 | 0 | 0 |
| Duomeen L-15 | 15 | 88 | | 10 | 14 | 1 | 3 |
| RO(CH$_2$)$_3$NH(CH$_2$)$_3$NH$_2$ (alkoxypropyldiamine): Diamine No. 2 | [b]13 | 93 | 0 | 0.3 | 2 | 0 | |
| RNHCH$_3$ (secondary amine): N-methyldodecylamine | 12 | 84 | | 6.0 | 32 | 5 | |
| R$_2$NH (secondary amines): | | | | | | | |
| Di-n-butylamine | 4 | 80 | | | 66 | 30 | |
| Di-n-hexylamine | 6 | 84 | | | 69 | 23 | |
| RN(CH$_3$)$_2$ (tertiary amines): | | | | | | | |
| N,N-dimethyloctylamine | 8 | 71 | | | 67 | 39 | 27 |
| N,N-dimethyldodecylamine | 12 | 95 | 50 | 30 | 27 | 30 | |
| N,N-dimethylhexadecylamine | 16 | 95 | | | 84 | 56 | |

[a] Control hatch rates 85 to 95%.
[b] R chain branched.

In Table II are reported results showing the effectiveness of selected compositions utilizing the selected components of the present invention.

TABLE II

Percent Hatch From *Ae. Aegypti Eggs Sprayed With* 0.2 Percent Diamine No. 2 and 1.0 Percent Diethanolamine or Ethylenediamine. Numbers in Parentheses Indicate Number of Eggs Tested

| | Diethanolamine | Ethylenediamine |
|---|---|---|
| Diamine No.2 with 0.2% decanol | 3.3(1084) | 0.0(646) |
| Diamine No.2 without 0.2% decanol | 1.5 (734) | 0.4(448) |

The embodiments of the invention in which an exclusive property or privilege is claimed are defined as follows:

1. An ovicidal spray composition useful for controlling Aedes aegypti mosquitoes consisting essentially of an aqueous solution containing a minor but effective amount of an apolar amine and a major amount of a water soluble polar amine wherein the apolar amine is a straight chain $\alpha$-amine of the formula $H_3C-(CH_2)_nNH_2$ where $n$=7–11 and where the water soluble polar amine is ethanolamine and where the concentration of apolar amine is from about 0.05 to 0.4 percent and the concentration of the polar amine is about 1 percent based on the total spray composition.

2. An ovicidal spray composition according to claim 1 wherein the concentration of apolar amine is from about 0.1 to 0.2 percent and the concentration of the polar amine is about 1 percent based on the total spray concentration.

3. An ovicidal spray composition according to claim 1 wherein the apolar amine is decylamine and the water soluble polar amine is ethanolamine.

4. A method of controlling Aedes aegypti mosquitoes which comprises treating the aedine eggs with a spray composition consisting essentially of a minor but effective amount of an apolar amine and a major amount of a water soluble polar amine and wherein the apolar amine in the spray composition is a straight chain $\alpha$-amine of the formula $H_3C-(CH_2)_nNH_2$ where $n$=7–11 and wherein the water soluble polar amine is an alkanolamine selected from the group consisting of ethanolamine, 3-amino-1-propanol, 1-amino-2-propanol, and 2-amino-1-butanol; hydrazine; primary diamines with 2–3 carbon atoms corresponding to the following formula:

$$H_2N-(CH_2)_n-CHX-NH_2$$

where $n$=1–2
X is H and
where $n$=1
X is $-CH_3$ or piperazine; and wherein the concentration of apolar amine is from about 0.05 to 0.4 percent and the concentration of the polar amine is from about 1 to 2 percent based on the total spray composition.

5. A method according to claim 4 wherein the concentration of apolar amine is from about 0.1 to 0.2 percent and the concentration of the water soluble polar amine is about 1 percent based on the total spray concentration.

6. A method according to claim 4 wherein the apolar amine is decylamine and the water soluble polar amine is ethanolamine.

* * * * *